O. S. MORE & L. G. LONG.
SINGLE PHASE MOTOR.
APPLICATION FILED APR. 1, 1912.
1,145,501. Patented July 6, 1915.
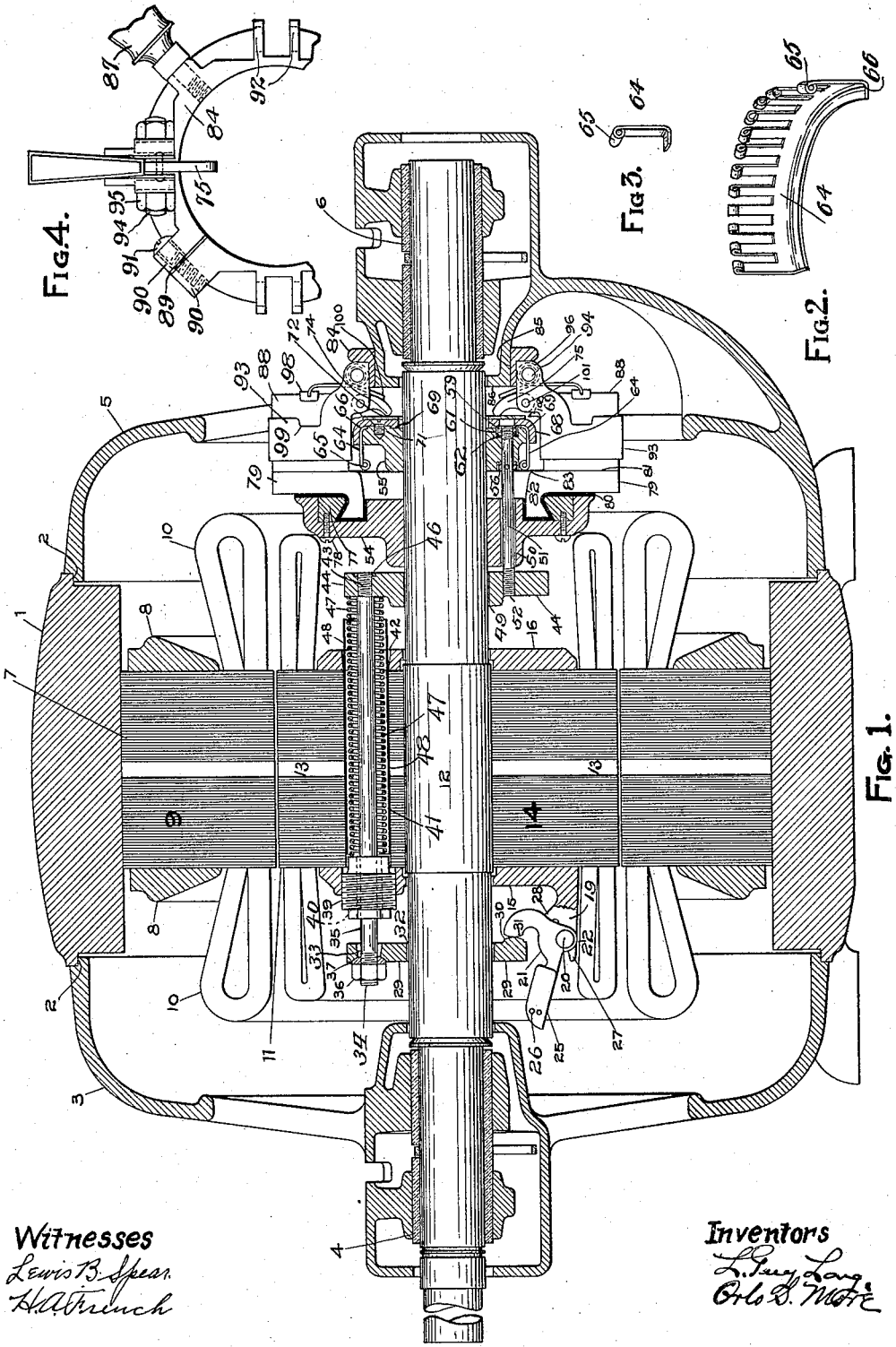
Witnesses
Lewis B. Spear.
H. A. French.
Inventors
L. Guy Long
Orlo S. More

UNITED STATES PATENT OFFICE.

ORLO S. MORE AND L. GUY LONG, OF INDIANAPOLIS, INDIANA, ASSIGNORS TO FAIRBANKS-MORSE ELECTRICAL MANUFACTURING COMPANY, OF INDIANAPOLIS, INDIANA, A CORPORATION OF INDIANA.

SINGLE-PHASE MOTOR.

1,145,501.  Specification of Letters Patent.  Patented July 6, 1915.

Application filed April 1, 1912. Serial No. 687,910.

*To all whom it may concern:*

Be it known that we, ORLO S. MORE and L. GUY LONG, citizens of the United States, residing in the city of Indianapolis, in the county of Marion, in the State of Indiana, have invented a certain new and useful Single-Phase Motor, of which the following is a full, clear, and exact description, such as will enable others skilled in the art to make and use the same.

Our invention consists in the construction and arrangement of parts hereinafter described and particularly pointed out in the claims.

In describing the various arrangements employed and shown in the drawings hereto attached and described in the specification we do not limit our invention to the precise form or construction of apparatus shown or the several parts thereto inasmuch as various alterations may be made without changing the scope of our invention.

Our object is to construct an efficient and economical single phase motor which is started as a commutator motor and which on the attainment of running speed by the automatic short circuiting of the individual coils of the rotor, operates as an induction motor.

Figure 1 is a sectional view, taken on two planes making a dihedral angle, of our motor showing the rotor laminations mounted upon the shaft, suitable openings being provided in said laminations to contain such parts as are required to connect the operating mechanism. Fig. 2 is a detail perspective view showing a group of commutator contact toes. Fig. 3 is a view, in perspective, of an individual toe. Fig. 4 is a detail end view of the brush holding ring.

In the drawings the frame is indicated by 1. The grooves shown at 2 serve as the seats for the bearing arms, 3 is the pulley end bearing arm and 4 the pulley end bearings. 5 is the commutator end bearing arm and 6 the commutator end bearings. The stator member is indicated by 7.

8 is the core clamping head.

9 shows the stator laminations held in position by the stator core clamping heads.

10 shows the stator coils which are embedded in the stator laminations.

11 indicates the rotor member, 12 the shaft, 13 the ventilating spaces and 14 the rotor laminations. These rotor laminations as here shown are built upon the shaft and are rigidly held in place by the retaining head 15 and the retaining ring 16. It is obvious that instead of placing these rotor laminations directly upon the shaft, a spider may be used and the laminations built upon the spider. From the retaining head 15 there extends out the bracket 19 which may be either an independent casting firmly attached to the retaining head or preferably as here shown a part of said retaining head. Upon this bracket is fastened the pin 20. The arm 21 is intermediately pivoted by means of the perforated ear 22 upon pin 20. The centrifugal weights 25 are here shown as part of the weight end of arm 21. They may, however, be separate pieces firmly fastened to said weight end and may be made so as to encircle the shaft.

26 shows holes which under certain circumstances we find desirable to drill in the weights 25 after the motor is assembled when it is desired to vary the number of revolutions at which the short-circuiting mechanism is to be thrown into operation. The weights 25 are of a predetermined overbalanced weight to suit the initial spring tension but owing to mechanical divergence it is sometimes desirable to make a final and nice adjustment and by thus drilling out metal and thereby reducing the overbalancing weight, we obtain a ready and accurate method of securing the desired adjustment.

27 is a stop on the bracket 19 which defines the outward movement of the centrifugal weights 25 and 28 is a similar stop which is preferably an integral part of bracket 19 and serves to hold the arm 21 in a predetermined position against the spring tension until such time as the centrifugal force produced by the rapidly revolving weights overcome the initial spring tension.

29 is a balancing plate which at the point 30 has a properly rounded surface to engage the lever end 31 of arm 21. The contracting surface of this end 31 is also rounded with a proper curve to work smoothly and evenly by a rolling action whereby friction and wear are avoided. Said plate 29 by virtue of opposing pressures becomes a balancing member between the possible varying tension of the springs. The balancing plate 29 is designed to move parallel to the shaft and the aperture 32 is made considerably larger than the diameter of the shaft.

We prefer to use two brackets 19 diametrically opposite each other upon which brackets the centrifugal weights 25 are borne. Upon the balancing plate but at a distance preferably of ninety degrees from the brackets and diametrically opposite each other are two holes indicated by 33. These holes are of greatest diameter at the commutator side of the motor and incline inwardly to the pulley end of the motor. Through each hole is slipped the end 34 of an actuating rod 35. The end 34 is threaded and is held in position by the hexagonal nut 36 A ball or spherical washer 37 is placed between the hexagonal nut and the balancing plate so that this plate may vary its position from the vertical without binding. Through a threaded aperture in the retaining head 15 is screwed the spring adjusting nut 39 and through the aperture 40 in said nut is passed the actuating rod. The actuating rod extends through the space 41 in the rotor laminations and through the aperture 42 in the retaining ring 16 and at the end 43 is attached to rod plate 44 through the threaded opening therein. A recess 46 at the commutator end of said opening is made for the purpose of riveting the rod end 43 to rod plate 44. There extends around the actuating rod between the spring adjusting nut 39 and the rod plate 44, the helical spring 47. The ends of the helical spring are flattened and rest against said parts.

48 is a tube of fiber or other suitable material which we sometimes place about the helical springs to prevent them catching on the rotor lamination when bent outwardly under centrifugal action. By the use of the spring adjusting nuts 39 any difference in the initial tension of the springs 47 may be eliminated. The helical spring 47 opposes the thrust of the actuating rod 35 and is so arranged as to hold an initial compression equal to the centrifugal force generated by the weights 25 at a predetermined number of revolutions at which the centrifugal device will operate. The rod plate 44 is preferably a cylindrical plate embracing the shaft through the opening 49 which is of a sufficiently larger diameter than the shaft to admit of a facile longitudinal movement thereon. Upon the rod plate at right angles to the points where the two actuating rods are attached are holes which we indicate at 50. The pull rods 51 are at their ends 52 threaded into the holes 50 in the rod plate. Each pull rod 51 passes through an opening in the commutator base 54 and is rigidly attached to the toe carrier plate 55 by the nut 56 which is fastened to the rod plate 51 by a pin; said nut being preferably square in contour and fitted into a square recess to prevent said rod 51 from working loose from the nut 59 which is on the outer end of the rod 51. The nut 59 is countersunk in the recess 61 of the toe carrier plate and is so arranged that a slight longitudinal adjustment may be had by the addition or subtraction of washers or distance pieces 62 in the recess 61 back of the nut 59.

The toes 64 are made up of stampings, castings, roll strips, hammered or formed pieces of copper, brass, bronze or other suitable conducting metal. The tips 65 of the toes are turned inwardly to avoid catching on the commutator face but the extra weight at that end will cause the toes when pliable to bend outwardly under the influence of centrifugal force and thereby make a more perfect contact with the commutator segments. Under certain circumstances, however, we turn in the tips 65 but slightly. These toes lie parallel to the shaft around the periphery of the toe carrier plate and the rounded tip is so arranged that the toe will slide within and make effective contact with the inner periphery of the commutator without catching upon the commutator face. It is obvious, however, that the toes may be inclined inwardly so as to slide farther within said inner periphery face of the commutator. The backs 66 of the toes are made to fit into and around a circular recess in the toe carrier plate. A flanged ring 68 serves to fasten and hold the toes firmly in position. Its outer flange fits over the toes and presses them against the outer periphery of the toe carrier plate. The inner flange 69 of this ring fits into a recess 70 of the toe carrier plate. The screw 71 fastens the flanged ring firmly to the toe carrying plate. A ring 72 of bronze, steel or other suitable metal is attached to the back of the flanged ring and provides a smooth riding surface for the end of the tension lever 74.

Firmly mounted upon the central shaft between the rod plate 45 and the toe carrier plate 55 is the commutator base 54. The binding ring 77 is held by the screw 78 to the commutator base and serves to hold the commutator segments 79 against displacement. The commutator segments are separated from the commutator base by suitable and usual insulation material 80 and are likewise arranged in the usual manner with insulating material between each segment. Where the radial or front face 81 of the commutator meets the inner periphery 82 of the commutator the surface is rounded as shown at 83. The inner periphery of the commutator is inclined inwardly so as to readily admit the toes and by virtue of this inclined face the tendency is to wedge said toes into a perfect contact with the commutator segments.

As the mission of the brushes is fulfilled as soon as the motor attains sufficient speed to short-circuit the commutator segments and become an induction motor through the agency of the centrifugal device, it is then desirable to relieve the pressure of the brushes against the face 81 of the commutator; this relaxation giving a more quiet running and more efficient motor and avoiding wear both on the brushes and on the commutator face. To accomplish this we employ a brush holding ring 84 which is so mounted upon the smooth surface 85 of the inner end 86 of the commutator end bearing 6 that by means of handle 87 it may be turned about this smooth surface to adjust the brushes 88 to the proper points of commutation. The terminal ends 89 of said brush holding ring have projecting lugs 90 at which there is a bearing screw 91. The lugs 92 forming jaws and serving as bearings, support the brush holder 93 by means of the bolt 94 on which bolt the nut 95 is placed. The springs 96 are intermediately coiled one or more times loosely around the bolt 94 and are pressed under a certain tension necessary to hold the brush firmly against the front face of the commutator while the motor is in the starting position. The outer ends of said spring are attached to brush clip 98 and the recess 99 in the brush holder allows the brush to be used until the clip has come within said recess. The end 100 of said spring bears upon the tension lever 75, which is free to move within certain prescribed limits. 102 is a stop produced by bending or turning under a part of the brush holder. This stop establishes the forward limit of the movement of said tension lever and is so placed that when the tension lever is pressed against said stop by the pressure of spring 96 there will be a space or gap left between the contact end of the lever and the face of the ring 72. This space or gap is obtained during the time that the toe carrying plate is drawn into engagement with the commutator and the motor is operating in its normal or running condition. Inasmuch as the toe carrying plate of which the plate 72 is a part is revolving at a high rate of speed while the point 74 is stationary it is evident that friction and wear are eliminated by maintaining the above mentioned interval between the ends of the levers and the face of the said plate. Said two points will make contact with each other only when the motor is in the starting condition.

In Fig. 1 our motor is shown in its starting condition. The centrifugal weights are not acting under centrifugal force and, therefore, the helical springs 47 press back the rod plate which, by means of the actuating rods, draw the balancing plate inwardly. The contact point 30 on the balancing plate is shown pressing against the point 31 on the lever end of arm 21. The stop 28 limits the inward movement of the lever arm and in turn the movement of the balancing plate and the rod plate. The toes upon the toe-carrying plate are out of contact with the inner periphery of the commutator, and the brushes are shown bearing upon the commutator face 31. The motor starts as a commutator motor and when it reaches a certain predetermined speed the centrifugal weights fly outwardly and the toe carrying plate is drawn within the inner periphery of the commutator, and at the same time the brushes are removed from the front face of the commutator. The motor then runs as an induction motor.

In Fig. 2 we show a group of toes which we prefer to use. It will be noticed that there is enough space left between each toe so that when the toes are drawn into the inner periphery of the commutator, the tips of the toes are touching each other. Since the toes through usage become worn and bent inwardly so as to fail to make perfect contact with the inner periphery of the commutator, despite its wedging action, we prefer to round and turn under the tips of the toes as shown at 65. By so doing any toe or toes thus bent inwardly, will be caused to bend outwardly, under the influence of centrifugal force, sufficiently to complete the ring of contacts.

In Fig. 3 we show a form of an undivided toe that may be used. Whenever the speed of the motor for any reason is brought below its predetermined speed the helical springs overcome the centrifugal force of the centrifugal weights, the toe carrier plate is pressed out of contact with the inner periphery of the commutator and in turn the brushes again receive the maximum pressure from the spring and press against the commutator face while the centrifugal weights drop back to their starting position. The motor will gradually slow down and stop in the condition shown in Fig. 1.

While the number of actuating rods, springs and kindred parts may be varied, we prefer to use two or four of the same and this motor is shown having two such sets of parts.

Having thus described our invention, what we claim and desire to secure by Letters Patent of the United States is:

1. In a self-starting single phase induction motor, the combination of a rotor member having a commutator, centrifugal weights carried by the rotor member, a balancing plate arranged to be operated by the centrifugal weights, a rod plate, a rod connecting the balancing plate and the rod plate, a spring opposing the thrust of the said rod, imparted thereto by the movements of the centrifugal weights, a carrier plate connected with the said rod plate, and short-circuiting toes supported by the said carrier plate arranged to be moved into engagement with the commutator when the centrifugal weights are moved upon the motor attaining its running speed, substantially as described.

2. In a self-starting single phase induction motor, the combination of a rotor member having a supporting shaft and a commutator, centrifugally acting weighted arms supported by the said rotor member, a balancing plate acted upon by the said arms, surrounding the said shaft and free to move along the same, a carrier plate surrounding the shaft and also free to move along the same, arranged adjacent to the commutator, short-circuiting contact toes carried by the last said plate and arranged to be brought into engagement with the commutator, connections between the balancing plate and the said carrier plate, and springs acting upon the said connections and opposing the movements of the said connected parts until the motor has attained its running speed.

3. In a self-starting single phase induction motor, the combination of a stator member, a rotor member having a central shaft and a commutator with an inclined inner peripheral face, centrifugally acting weighted arms carried by the rotor member, a balancing plate acted upon and moved by the said weighted arms, a carrier plate arranged adjacent to the commutator, connections between the balancing plate and the carrier plate for causing them to move together, and short-circuiting elastic toes supported by the carrier plate and arranged to be brought into engagement with the said inclined face of the commutator when the motor attains its running speed.

4. In a self-starting single phase induction motor, the combination of a stator member, a rotor member having a commutator, commutator brushes, springs for engaging with the brushes and holding them with yielding force against the commutator, a movable carrier plate, short-circuiting contacts supported by the said plate and arranged to engage with the commutator, centrifugal means connected with the said carrier plate and arranged to move it to bring the short-circuiting contacts into operation when the motor attains its running speed, and means operated by the said movable carrier plate, when in the position it occupies before the motor has attained full running speed, for placing the said spring under tension to operate the brushes.

5. In a self-starting single phase induction motor, the combination of a stator member, a rotor member having a central supporting shaft, and a commutator at one of its ends, centrifugal weights carried by the rotor member at that end opposite the commutator, a balancing plate acted upon by the centrifugal weights surrounding the shaft and free to move along the same, a carrier plate arranged adjacent to the said commutator surrounding the shaft and free to move along the same, connections including rods extending through the rotor member, between the said balancing plate and the carrier plate, short-circuiting contacts supported by the said carrier member, arranged to be brought into engagement with the commutator, through the action of the centrifugal weights, when the motor has attained full running speed, and springs surrounding the said connecting rods and acting thereon in opposition to the centrifugal weights.

6. In a self-starting single phase induction motor, the combination of a stator member, a rotor member, having a commutator with an inner peripheral face, a movable carrier, a series of short-circuiting elastic contact toes supported by the carrier, the free tips of which are turned over and weighted, the toes being in electrical connection with each other, and centrifugally operated means for moving the carrier for the said contact toes to bring the latter into engagement with the commutator when the motor attains full running speed.

7. In a self-starting single phase induction motor, the combination of a stator member, a rotor member, having a commutator with an inner peripheral face, a movable carrier, a series of short-circuiting elastic contacts supported by the carrier, the free tips of which are turned and weighted, the contacts being in electrical connection with each other, and centrifugally operated means for moving the carrier for the said contacts to bring the latter into engagement with the commutator when the motor attains full running speed.

ORLO S. MORE.
L. GUY LONG.

Witnesses:
Lewis B. Spear,
H. A. French.